3,703,427
THERMAL IMPULSE SEALING BAR ASSEMBLY
John C. Sellers, 507 Signal Hill Road, Barrington, Ill. 60010, and John W. Schneiter, 1217 E. Fremont, Arlington Heights, Ill. 60004
Filed June 1, 1971, Ser. No. 148,495
Int. Cl. B30b 15/34; G05d 23/00
U.S. Cl. 156—359     13 Claims

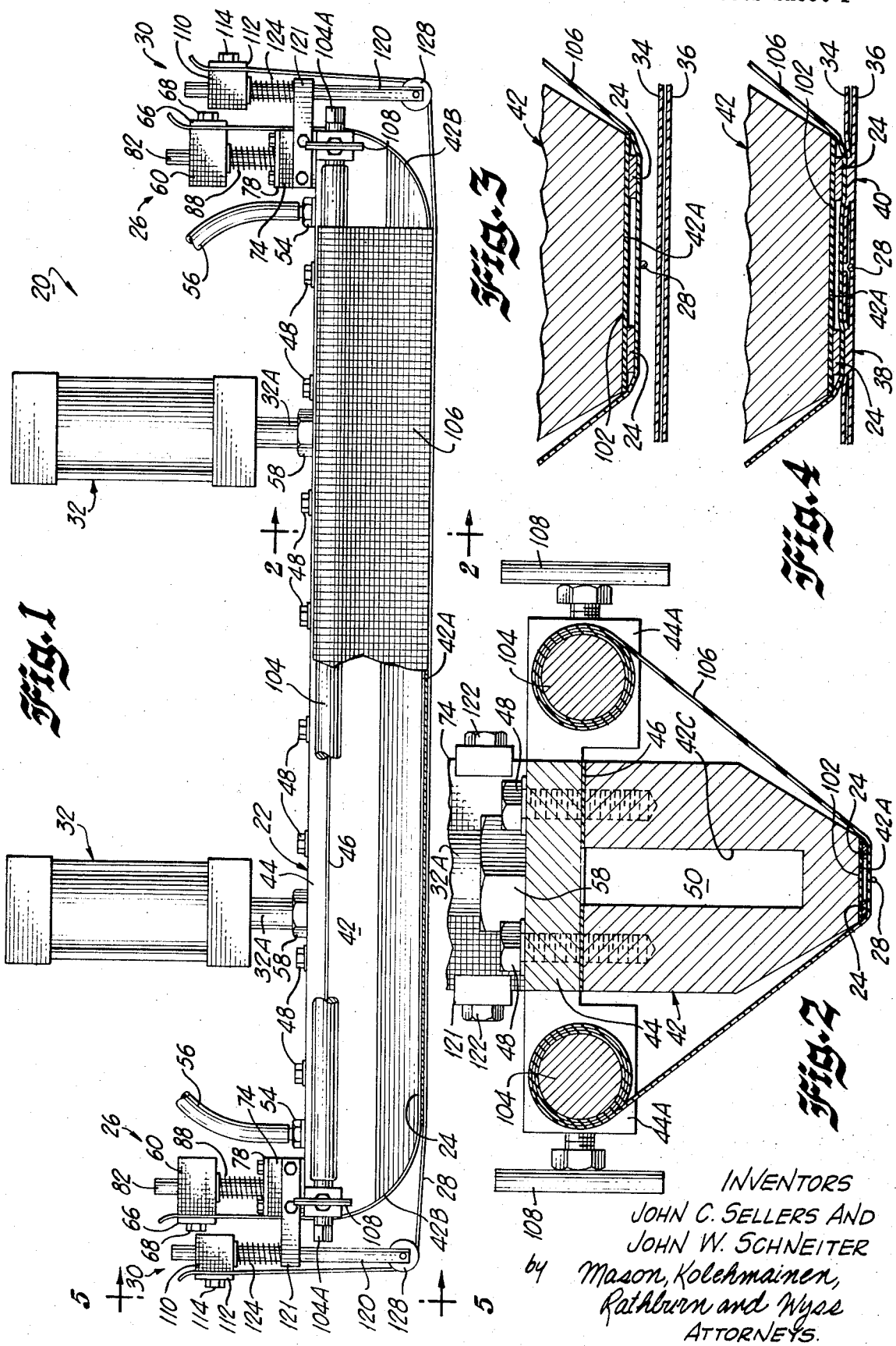

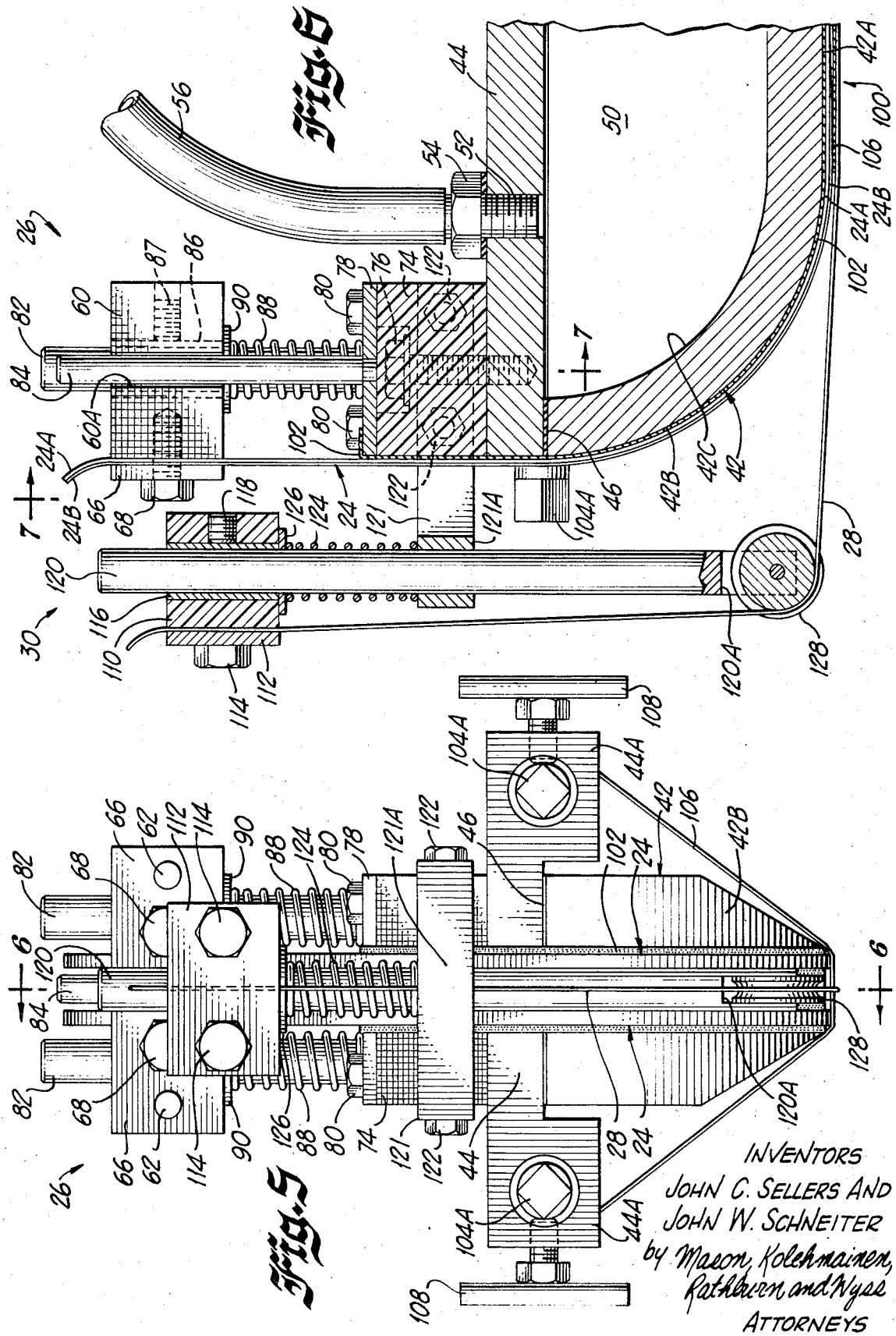

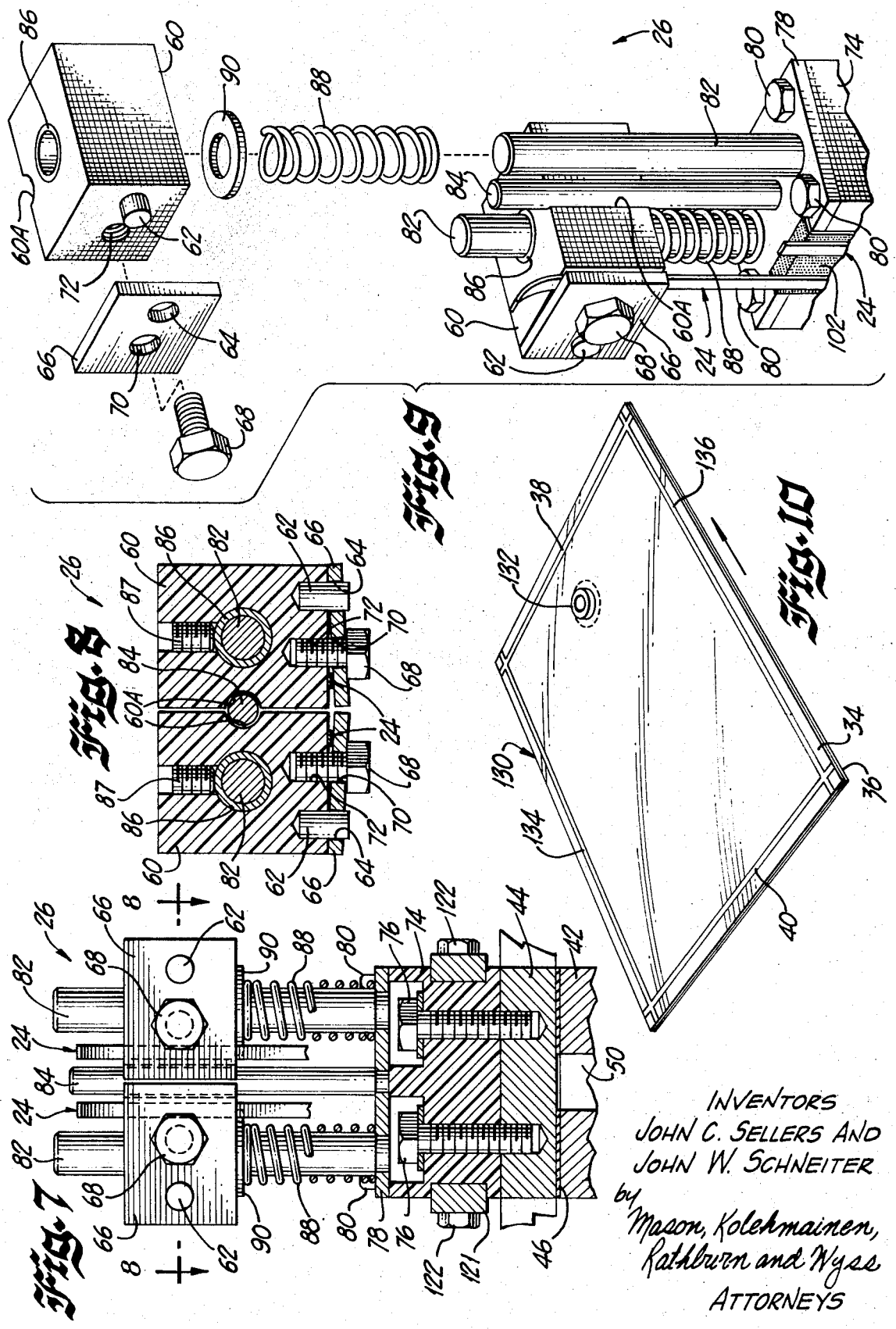

ABSTRACT OF THE DISCLOSURE

The disclosed thermal impulse sealing bar assembly includes an elongated thermally conductive bar defining a hollow chamber through which a cooling fluid is circulated. A flat lower surface of the bar faces the sheet or web material to be sealed, and the ends of the bar have curved or arcuate surfaces merging with the flat lower surface. A pair of flat resistance heating elements are mounted in spaced and parallel positions on the flat surface and include terminal portions at their opposite ends passing over the curved guide surfaces to be clamped in terminal blocks slidably mounted on the bar. The terminal blocks are biased for movement in a direction generally perpendicular to the flat sealing surface to hold the resistance heating elements against the guide and flat surfaces, thereby avoiding any interference between the material to be sealed and the terminal blocks. A layer of low resistivity, electrically conductive material on the terminal portions of the elements limits heating thereof to the part actually pressed against the material to be sealed so as to avoid the formation of "hot spots." A resistance cutting wire is disposed between the heating elements used for sealing.

---

This invention relates to a thermal impulse sealing bar assembly and, more particularly, to such an assembly having a new and improved heating element and heating element mounting structures.

Thermal impulse sealing assemblies using elongated and cooled bars of thermally conductive material in which the bar has a sealing surface carrying a resistance heating element are well known. These bars have terminal blocks to which the ends of the heating element are clamped, and these blocks are biased and movable in a direction parallel to the sealing surface in order to take up changes in dimension resulting from thermally controlled expansion and contraction. These known arrangements are subject to a number of deficiencies.

More specifically, the heating elements or bands generally do not and cannot be moved against the material to be sealed in those end portions disposed in immediate proximity to the terminal blocks. This reduces both the heat dissipated and the cooling by the bar in those areas with the result that "hot spots" are formed. These "hot spots" tend to shorten the effective life of the band. In addition, when the band is used to make consecutive seals parallel to or in the direction of material movement, the commonly desired overlapping of the consecutive seals places the "hot spots" over the seal with the consequent weakening of the seal.

The use of the known arrangement of terminal blocks movable in the direction of the seal causes additional problems in making the seals parallel to the direction of web movement. There is a tendency for the web material to contact the terminal block with the result that either the free movement of the web is impeded or the web impedes the biased movement of the terminal block resulting from heat induced expansion of the band. If this happens, the band is not held under sufficient tension, and there is a tendency for the band to form a kink. These kinks tend to concentrate heat in the kinked area with the result that the band soon breaks at this point.

Accordingly, one object of the present invention is to provide a sealing bar assembly that avoids the formation of "hot spots" in the heating elements.

A further object is to provide a sealing bar assembly including new and 'improved means for supporting or mounting the heating element on the sealing bar.

A further object is to provide a new and improved sealing bar assembly with clamping and mounting means for the heating element spaced away from any possible interference with the material to be sealed.

A further object is to provide a new and improved heating element for a thermal impulse sealing bar.

In accordance with these and many other objects, an embodiment of the invention comprises an elongated sealing bar formed of thermally condutive material and having a generally flat or uniplanar lower surface adapted to be placed in engagement with web, sheet, or film material to be sealed. The elongated bar has generally arcuate or curved ends merging with the flat surface and defines a hollow inner chamber through which a cooling medium is circulated. An elongated flat resistance heating element or band is positioned on the flat surface and passes around the curved end or guide surfaces so that its end portions extend upwardly to be clamped to terminal blocks which are mounted for reciprocating movement on the top or upper surface of the bar. These terminal blocks are resiliently biased for movement in a direction generally transverse to the plane of the heating surface, thereby holding the heating elements in intimate engagement with the flat and curved surfaces of the bar. With the curved ends of the bar and the disposition of the terminal blocks and their mounting means spaced on the opposite side of the bar from the sealing means, there is no possible interference between the terminal blocks and the material to be sealed when the sealing bar assembly is used to make seals either parallel to or transverse to the direction of movement of the material. This prevents any possible kinking of the resistance heating element. Further, the curved end surfaces facilitate relative movement between the sealing bar and the web material in continuous feed sealing operation.

To further insure the absence of "hot spots," the resistance heating element is provided with a layer or lamina of electrically conductive, low resistivity material on the end portion of the heating element extending from the terminal blocks to a point on or adjacent the flat sealing surface of the bar in the area in which pressure contact with the material to be sealed is present. This low resistivity material effectively shunts the high resistivity material of the heating element and provides heating of this element only in the central portion in which adequate cooling by the bar or dissipation of heat to the material is provided.

The sealing bar assembly can be provided with a pair of parallel resistance heating elements formed and mounted as described above to form a pair of spaced seals. In addition, a resistance-type heating element such as a wire carried on similar mounting means can be disposed interposed between and spaced somewhat below the resistance heating elements to provide a cutoff element for severing the sheet or web material between the seals formed by the spaced heating elements.

Many other objects and advantages of the present invention will become apparent from considering the following detailed description in conjunction with the drawings in which:

FIG. 1 is a side elevational view of a thermal impulse sealing bar assembly embodying the present invention;

FIG. 2 is an enlarged sectional view taken along line 2—2 in FIG. 1;

FIG. 3 is an enlarged sectional view of the lower portion of FIG. 2 illustrating the sealing bar assembly spaced from a pair of superimposed webs or sheets of material to be sealed;

FIG. 4 is a view similar to FIG. 3 illustrating the sealing bar assembly in engagement with the webs to produce two spaced seals and to sever the webs between the seals;

FIG. 5 is an enlarged end elevational view looking in the direction of line 5—5 in FIG. 1;

FIG. 6 is a sectional view taken along line 6—6 in FIG. 5;

FIG. 7 is an enlarged fragmentary sectional view taken along line 7—7 in FIG. 6;

FIG. 8 is a sectional view taken along line 8—8 in FIG. 7;

FIG. 9 is an exploded perspective view of a terminal block mounting assembly used in the sealing bar assembly of FIG. 1; and FIG. 10 is a perspective view of a flexible container that can be manufactured using the sealing bar assembly of the present invention.

Referring now more specifically to FIG. 1 of the drawings, therein is illustrated a thermal impulse sealing bar assembly which is indicated generally as 20 and which embodies the present invention. The assembly 20 includes a sealing bar or support indicated generally as 22 of thermally conductive material along the lower surface of which a pair of resistance heating elements indicated generally as 24 are disposed in spaced parallel relation. The opposite ends of the heating elements pass upwardly from the plane of the lower surface of the bar 22 to be secured to terminal block assemblies indicated generally as 26 carried on the opposite ends of the upper surface of the bar 22. These assemblies 26 resiliently bias the heating elements 24 toward the bar 22 and compensate for variations in the length of the elements 24 due to expansion and contraction thereof during operation as well as afford means for connecting the heating elements to an external impulse source of heating current (not shown).

The illustrated sealing bar assembly 20 is designed to produce spaced seals in the sheet or web material and to sever the web between the seals. Accordingly, the assembly 20 includes an elongated heating element or cutoff wire 28 located between the heating elements 24 (FIG. 2) and having end portions coupled to a pair of terminal block assemblies and mounting means indicated generally as 30 which are carried outwardly of the assemblies 26 at opposite ends of the bar 22. A pair of pneumatic cylinders indicated generally as 32 secured to the bar 22 are provided for moving the assembly 20 into and out of engagement with the web material. When the cylinders 32 are actuated, the assembly 20 is moved into engagement with, for example, a pair of superimposed sheets 34 and 36 (FIG. 4) of plastic material so that the spaced elements 24 produce two seals in the webs 34 and 36 indicated generally as 38 and 40, and the element 28 severs the webs 34 and 36 at a point located between the seals 38 and 40. The resistance sealing elements 24 and the cutting element 28 are supplied with impulse currents of suitable magnitude and duration to provide the heat necessary for forming the seals 38, 40 and for severing the webs 34, 36. Further, if desired, a pressure or backing bar can be disposed beneath the webs 34, 36 so that pressure in conjunction with heat is used to effect the seals. Following the termination of the current, the heat of the elements 24 is dissipated in the thermally conductive body of the bar 22, and the cylinders 32 retract the assembly 20 to an inoperative position to permit feeding of the next increment of the film 34, 36.

Referring now more specifically to the construction of the sealing bar or support 22, this bar is formed in two parts by an elongated lower member 42 and an elongated upper plate 44. Both of the members 42 and 44 are preferably formed of a metal such as aluminum possessing high thermal conductivity. The lower member 42 is provided at its lower end with two inwardly tapered side walls terminating in a flat or uniplanar lower surface or sealing surface 42A on which the heating elements 24 are mounted. The opposite ends of the member 42 are provided with arcuate or curved guide surfaces indicated at 42B (FIG. 1). A slot or recess 42C (FIG. 2) is formed in the upper wall of the member 42.

The top member or plate 44 is secured to the upper wall of the member 42 with a sealing gasket 46 interposed therebetween by a plurality of suitable fastening means such as a number of machine bolts 48. The top plate 44 completes the enclosure of the recess 42C to provide a cavity or chamber 50 through which a cooling fluid such as water is circulated. To provide for such circulation, a pair of threaded fittings 52 threaded into openings in the top plate 44 at its opposite ends and secured by jamb nuts 54 (see FIGS. 1 and 6) are provided. The openings in which the fittings 42 are threaded communicate with the chamber 50 so that a pair of flexible lines or hoses 56 coupled to a fluid source (not shown) can circulate the cooling fluid through the chamber 50 along the entire length of the elongated bar 22. The top plate 44 is also secured at spaced positions to two pistons or plungers 32A forming a pair of the pneumatic cylinder assemblies 32 by suitable means such as a threaded connection secured by a jamb nut 58. The assemblies 32 are suitably secured on a supporting frame (not shown) for the machine.

As set forth above, the illustrated sealing bar assembly 20 is one designed to produce a pair of parallel seals such as the seals 38 and 40 (FIG. 4) in the webs 34, 36 of plastic material. Accordingly, the assembly 20 includes a pair of resistance heating elements 24 disposed in spaced parallel positions extending in the direction of elongation of the sealing surface 42A on the space bar 42 and passing around the curved ends 42B thereof so that the free ends or end portions of these heating elements can be secured by the terminal blocks and terminal block mounting assemblies 26. These assemblies (FIGS. 5–9) located at opposite ends of the assembly 20 are identical, and each include two substantially identical terminal blocks and mounting means. Each of the terminal blocks includes a dielectric or insulating block 60, from one side wall of which extends a locating pin 62 adapted to be received within a corresponding recess 64 (FIG. 9) formed in a metal or electrically conductive clamping plate 66. A threaded fastener or machine bolt 68 extends through another opening 70 in the plate 66 to be received within a tapped opening 72 in the insulating block 60. To electrically and mechanically attach the end of the resistance heating element 24 to the terminal blocks 60, this end is interposed between the plate 66 and the block 60, between the threaded fastener 68 and the end of the plate 66. The threaded fastener 68 is tightened to clamp the resistance element 24 between the plate 66 and the block 60 as shown, for example, in FIG. 8. The two terminal block assemblies 26 disposed at both ends of the assembly 66 are mirror images of each other so that both heating elements 24 are disposed adjacent each other or lie side by side (FIG. 8).

To provide means for mounting the terminal blocks 60 for translatory movement in a direction inclined to or generally transverse to the plane of the sealing surface 42A, there is provided at each end of the top plate 44 an insulating block 74 (FIG. 7) which is bolted to the top plate 44 by a plurality of threaded fasteners 76 whose heads are disposed within recesses in the upper surface of the insulating block 74. These recesses are closed by an electrically conductive or metal top plate 78 (FIGS. 7 and 9) secured in position by threaded fasteners 80. The plate 78 carries a pair of polished metal shafts or posts 82 disposed in parallel side-by-side relation with a smaller diameter guide post 84 disposed therebetween. Each of the terminal blocks 60 includes a centrally disposed opening in which is disposed a cylindrical bronze bearing 86 secured in position by a set screw 87 threadedly received within a corresponding opening in a wall of the terminal block 60. This permits free sliding movement between the posts or shafts 82 and the insulating terminal blocks 60. To prevent rotary movement of the blocks 60 about the axis of translation afforded by the posts 82, each of the blocks 60 is provided with a semicircular or semicylindrical recess 60A along one side. The guide post 84 is slidably received within the facing recesses 60A in the adjacent contact blocks 60 (FIGS. 7 and 8).

To provide means for applying an initial bias or tension to the heating bands 24, a compression spring 88 is disposed on each of the posts 82 interposed between the plate 78 and a washer 90 bearing on the lower surface of each of the blocks 60. By suitably compressing the springs 88 prior to clamping the ends of the bands 24 to the blocks 60 by tightening the machine screws 68, the initial tension can be controlled. Contraction of the heating bands 24 moves the blocks 60 downwardly against the bias of the springs 88, and expansion of the bands 24 permits upwardly directed movement of the blocks 60 under the urging of the compression springs 88. The plate 66 or the fasteners 68 can be used for extending electrical connections to the external impulse heating current source (not shown).

Each of the heating elements or bands 24 is of a new and improved construction to facilitate the formation of good seals and to avoid the generation of "hot spots." More specifically, the heating band 24 is formed throughout its length of an electrically conductive material of high resistivity such as a nickel-chromium alloy. When subjected to an impulse of relatively high current, the I²R loss of this material develops the heat necessary to form the seal, and this heat is rapidly dissipated through the thermally conductive body, particularly of the lower member 42, of the sealing bar 22 on termination of current flow. However, the end portions of the heating element are formed of a laminar construction (FIG. 6) with an inner lamina 24A comprising a continuous length or band of the high resistivity material. At the end portions of the heating bands 24, however, an outer or second lamina 24B is provided of an electrically conductive material of relatively low resistivity such as silver or German silver. The lamina 24B extends from the free end of the heating band 24 or at least the portion contacted by the plate 66 to a point indicated generally by an arrowhead 100. The point 100 is so selected that the outer lamina or layer 24B of highly conductive material terminates in the area in which the curved guide surface 42B merges into the flat sealing surface 42A or, stated alternatively, at the point at which pressure on the films 34 and 36 will be exerted by the sealing bar 22. This highly conductive lamina 24B which is provided at each end of the heating band 24 essentially provides a low resistance or impedance shunt around the inner layer 24A of high resistivity material so that an insignificant amount of I²R loss occurs, and very little heat is generated in the band 24 until the area is reached at which the band is subjected to pressure when the assembly 20 is moved against the webs 34, 36. In this pressurized area, heat is dissipated into the material 34, 36, and the heat transfer to the thermally conductive wall of the member 42 and thus to the cooling chamber 50 is more efficient. Accordingly, "hot spots" cannot develop in those locations where they were previously encountered, i.e., the point of transition between the bearing and nonbearing surfaces of the heating band. Further, the layer 24B can gradually blend or merge into the layer 24A with the result that a gradual voltage gradient is created at this point. In order to electrically isolate the continuous inner layer 24A of high resistivity material of the heating band 24 from the sealing bar 22, a layer, lamina, or sheet of heat resistive insulating material 102 is interposed between the band 24 and all adjacent surfaces of the sealing bar 22. The layer 102 preferably comprises a fibrous glass material impregnated with polytetrafluoroethylene.

In addition, it is desirable to prevent direct contact between the lower or outer surfaces of the heating elements 24 and the material to be sealed such as the adjacent web 34 so as to prevent adherence or contamination of these heating bands. In addition, it would be desirable to provide a continually renewable or clean surface interposed between the web 34 and the heating bands 24. In the present invention this is provided by supplying a pair of rolls or rollers 104 (FIGS. 1, 2, and 5) disposed on opposite sides of and extending generally parallel to the sealing bar 24 spaced above the sealing surface 42A. A continuous length of heat resistant insulating material 106 which can comprise impregnated fibrous glass material as referred to above extends between the two rollers 104 and passes over and around the sealing surface 42A of the lower member 42 of the sealing bar assembly 20 so as to engage the outer surfaces of the two heating bands 24 in the area in which contact is made with the material to be sealed. To provide means for mounting the rollers 104 on the assembly 20, the top plate 44 is provided at its opposite ends with two oppositely extending portions 44A through which extend bearing openings adapted to receive reduced diameter end portions of the rollers 104. The extreme ends of the rollers 104 are provided with portions 104A of square cross section for receiving a wrench. Four thumb screws 108 are threaded in suitable apertures in the end walls of the projections 44A extending into the bearing openings to provide means for clamping the rollers 104 in desired positions.

When it is desired to place a fresh surface between the heating bands 24 and the web 34, the four thumb screws 108 are loosened, and a tool is used to rotate one or the other of the rollers 104 to unwind a portion of the web 106 from one of the rollers and to wind this web onto the other roller. When a fresh surface has been disposed in the desired position, the thumb screws 108 are tightened to lock the two rollers 104 in the adjusted position.

As set forth above, the resistance heating wire 28 serves as a cutoff to sever the webs 34, 36 between the seals 38, 40. The heating element 28 is coupled to and carried by the terminal block assemblies 30 located at opposite ends of the sealing bar 22. The heating element 28 is formed of a high resistivity, electrically conductive material such as the nickel-chrome alloy used in the heating bands 24.

The two terminal block and mounting assemblies 30 located at opposite ends of the sealing bar 22 are identical. As illustrated particularly in FIGS. 5 and 6, each of the assemblies 30 includes a generally rectangular or square block 110 of insulating material to which is secured an electrically conductive front or clamping plate 112 by a pair of spaced and threaded fasteners 114. The free end of the heating element or wire 28 is interposed between the plate 112 and the block 110 between the two fasteners 114 so that tightening the fasteners 114 clamps the wire 28 against the insulating block 110 and holds this wire in a predetermined position. The fasteners 114 or the plate 112 can be used to extend electrical connections to an external current source used to energize the resistance heating element 28.

To provide means for slidably mounting the terminal block 110 for translatory movement in a direction generally transverse to the greater extent of the wire 28, the block 110 is provided with an opening in which is secured a bronze or other metal bearing 116 secured in position by a set screw 118. The bearing 116 slidably receives the upper end of a post or shaft 120, an intermediate portion of which is secured within an opening in a bight portion 121A of a generally U-shaped supporting member 121, the free ends of the legs of which are bolted to and disposed within a recess in the side walls of the dielectric block 74 in the assembly 26 by a plurality of machine screws or fasteners 122. A compression spring 124 interposed between an upper surface of the bight portion 121A and a washer 126 bearing against the lower wall of the block 110 biases the block upwardly (FIGS. 5 and 6).

At the lower end of the post 120, there is provided a bifurcation 120A in which is rotatably mounted a pulley 128 having a grooved outer periphery around which passes the resistance heating wire 28. In adjusting the assembly 20, the compression spring 124 is compressed to the degree necessary to provide the initial tension on the resistance heating element 28 in its cold state, and the fasteners 124 are then tightened so that the plate 112 clamps the free end of the wire 28 in its adjusted position. When the wire 28 expands during heating, the blocks 110 move upwardly under the force of the compression springs 124 so that the wire passes around the pulleys 128 to take up the elongation and maintain the wire 28 in its desired position. Contraction of the wire 28 on cooling moves the blocks 110 in the assemblies 30 downwardly against the bias of the compression springs 124.

FIG. 10 of the drawings illustrates a sealed plastic or flexible liner 130 with an inserted inlet or filler 132 that can be produced using the sealing bar assembly 20 of the present invention. The container 130 can be formed using the continuous webs 34, 36 moving through the machine in the direction of the arrows shown in FIG. 10 with the sealing bar assembly 20 disposed transverse to the indicated direction of movement of the webs to produce in one operation the leading edge seal 38 for a given liner 130 and the trailing edge seal 40 for the immediately preceding liner 130, the webs 34, 36 being severed between the seals 38 and 40 by the heating element 28. Two side seals 134, 136 can be formed by sealing bar assemblies similar to the assembly 20 disposed adjacent the side edges of the webs 34, 36 extending in the direction of movement of these webs. These modified assemblies would include only a single heating band 24 and associated terminal block assemblies 26, and the cutoff means including the resistance heating element 28 and the terminal block assemblies 30 would also be removed. These two side seal forming units preferably are located upstream from the assembly 26 forming the end seals 38, 40 and severing the webs 34, 36.

Referring now more specifically to the operation of the sealing bar assembly 20, the webs 34, 36 are advanced in their direction of movement which extends transverse to the direction of elongation of the bar 22 a distance required to produce, for example, the liner or container 130. If desired, these webs are advanced over a conventional pressure bar. When the webs 34, 36 are in position, the pneumatic cylinder assemblies 32 are actuated to move the sealing bar from the position shown in FIG. 3 toward the position shown in FIG. 4. The cutoff element 28 which underlies the web 106 is moved into engagement with the upper web 36, and the heating bands 24 are pressed against the web 34 at positions spaced on opposite sides of the heating element 28. The external current sources are then energized in a desired sequence and for the desired period so that the heat developed in the spaced bands 24 fuses the webs 34, 36 along the lines shown in FIG. 10 to produce the seals 38 and 40, the seal 40 being the trailing edge of, for example, one liner 38 and the seal 38 being the leading seal on the next container 130 to be formed. The energization of the cutoff heating element 28 lying in direct contact with the web 34 sufficiently softens the material of the web that this web and the underlying web 36 are severed. The pneumatic assemblies 32 are then controlled, preferably following a period adequate to insure sufficient cooling of the seals 38, 40 to retract the assembly 20 and to permit further feeding of the webs 34, 36.

During the period in which the heating bands 24 are pressed against the webs 34, 36 and subjected to an impulse of high amplitude current, these heating bands expand so that the compression springs 88 move the blocks 60 upwardly on the guide posts 82 to the extent necessary to insure that these bands remain in contact with the insulating layer 102 on the sealing bar 22 and to prevent the formation of kinks. Because of the conductive layer 24B on the end portions of the bands 24, these bands are heated only in the area in which these bands contact the webs 34, 36 through the intervening web 106. Accordingly, when the energizing current terminates, the heat of the bands 24 is adequately dissipated by transmission to the webs 34, 36 or through the insulating layer 102 to the thermally conductive material of the lower bar member 42 which is continuously cooled by the circulating fluid. Because of the control exercised over the extent of heating of the bands 24 thus insuring heating in only the areas in which adequate heat dissipation can be obtained, the formation of "hot spots" is avoided. By the arrangement of the terminal block and mounting assemblies 26, 30 at the upper surface of the sealing bar 22, no unnecessary structures are disposed adjacent the path of movement of the webs 34, 36, and the accessibility of the terminal blocks for replacement of or adjustment of the heating bands 24 in the heating element 28 is materially facilitated. Further, this disposition of the assemblies 26, 30 positively insures that movement of the terminal blocks 60, 110 is not impeded by engagement with the web 34 during the heating interval in which the bands 24 or the wire 28 become elongated. This insures that adequate tension is always maintained on these elements to prevent the formation of kinks and accelerated destruction of these heating elements.

The curved guide surfaces 42B combined with the use of the high conductivity layers 24B extending over controlled portions of the ends of the heating bands 24 is also of particular advantage in those modified forms of the assembly 20 used to form the side seals 134, 136 on the flexible liner or container 130 (FIG. 10). More specifically, because of the necessity or desirability of forming continuous side seals 134, 136, the length of the side sealing bars 22 considered with the increment imparted to the webs 34, 36 is such that the seal formed on one operation overlaps the seal formed in a prior operation. If "hot spots" are formed toward the ends of the band as in the prior art, these "hot spots" tend to destroy or damage the seal. This is avoided in the sealing bar assembly 20 of the present invention because the curved guide surfaces 42B combined with the controlled length of the highly conductive layer 24B permits the generation of substantial heat in only those areas of the sealing bar 22 at which could be suitably and adequately dissipated on termination of the energizing current impulse. Further, the terminal block assemblies 26 are remote from the path of movement of the webs 34, 36 with the result that their movement on expansion of the heating band 24 cannot possibly be impeded. In addition, the curved surface 42B, particularly the one facing toward the incoming moving webs 34, 36, insures an absence of interference between the sealing bar assembly 20 and proper web movement.

Although the present invention has been described with regard to a single illustrative embodiment thereof, it should be understood that numerous other modifications and embodiments can be devised by those skilled in the art which will fall within the spirit and scope of the principles of the present invention.

What is claimed and desired to be secured by Letters Patent of the United States is:

1. A thermal impulse sealing bar assembly for sealing web or film material comprising
an elongated support formed of thermally conductive material and having an elongated surface lying generally in a plane to be disposed adjacent the material to be sealed,
resistance heating means extending along said surface and having terminal portions at its opposite ends,
a pair of terminal blocks coupled to the terminal portions of the heating means, and mounting means mounting the pair of terminal blocks on the opposite ends of the support, said mounting means mounting at least one of the terminal blocks spaced away from the elongated surface on the opposite side of said surface from the material to be sealed and at an angle to said plane.

2. The sealing bar assembly set forth in claim 1 in which
a guide surface is provided at the end of the support curving away from the plane of the elongated surface against which the terminal portion of the heating means is disposed.

3. The sealing bar assembly set forth in claim 2 in which
the mounting means includes means mounting the terminal block for movement in a direction generally perpendicular to said plane to bias the heating means against the guide and elongated surfaces.

4. The sealing bar assembly set forth in claim 3 in which
the terminal portions of the heating means include an electrically conductive layer of relatively low resistivity on the heating means in the area between the terminal blocks and the ends of the elongated surface.

5. A thermal impulse sealing bar assembly for sealing web or sheet material comprising
a thermally conductive support with a surface facing toward the material to be sealed,
a resistance heating element of relatively high resistivity mounted on said support and extending along said surface, said heating element having terminal portions,
and a layer of electrically conductive material on the resistance heating element in said terminal portions and having relatively low resistivity, said layer extending along the length of the resistance heating element to control the length of the seal formed in the material.

6. A thermal impulse sealing bar assembly for sealing sheet and web material comprising
an elongated and thermally conductive support having an elongated seal applying surface adapted to face toward the material to be sealed and lying generally in a plane, said support having curved guide surfaces at its opposite ends,
resistance heating means having a heating portion disposed adjacent the seal applying surface and terminal portions at the opposite ends disposed adjacent the guide surfaces,
terminal blocks coupled to the terminal portions of the heating means and located at the opposite ends of the support,
and mounting means movably mounting the terminal blocks on the support and biasing the terminal blocks for movement away from the support in a direction transverse to the plane to bias the heating means against the guide and seal applying surfaces of the support.

7. The sealing bar assembly set forth in claim 6 including
a relatively low resistivity layer on the terminal portions of the heating means.

8. The sealing bar assembly set forth in claim 7 in which
the resistance heating means includes a pair of spaced, parallel resistance heating elements extending in the direction of elongation of the support.

9. The sealing bar assembly set forth in claim 8 including
an elongated and narrow electrical heating element for cutting the material to be sealed, said narrow heating element being disposed between the pair of spaced and parallel resistance heating elements and spaced from contact with the seal applying surface.

10. The sealing bar assembly set forth in claim 9 including
a layer of insulating material interposed between the narrow electrical heating element and the pair of spaced resistance heating elements.

11. The sealing bar assembly set forth in claim 6 in which
the mounting means includes posts mounted on the support extending generally perpendicular to said plane,
and the terminal blocks are slidably mounted on the posts.

12. The sealing bar assembly set forth in claim 11 in which
the mounting means includes biasing springs encircling the posts and interposed between the support and the terminal blocks.

13. In combination with a thermally conductive heating bar for sealing material,
a heating element of relatively high resistivity having end portions and a center portion adapted to be placed adjacent the material,
and a layer of relatively low resistivity, electrically conductive material on the end portions of the heating element.

References Cited
UNITED STATES PATENTS

| 2,581,977 | 1/1952 | Spalding et al. | 156—359 |
| 3,299,251 | 1/1957 | Zelnick | 219—243 |
| 3,494,816 | 2/1970 | Feher | 156—359 |
| 3,547,743 | 12/1970 | Tunner | 156—583 |

NORMAN G. TORCHIN, Primary Examiner

A. T. SURO PICÓ, Assistant Examiner

U.S. Cl. X.R.

156—380, 583